United States Patent [19]

Sato et al.

[11] Patent Number: 4,591,577

[45] Date of Patent: May 27, 1986

[54] SOLID CATALYST COMPONENT FOR ALPHA-OLEFIN POLYMERIZATION AND PROCESS FOR PRODUCING SAME

[75] Inventors: Akihiro Sato; Masami Tachibana, both of Ichiharashi; Hiroshi Shimizu, Chibaken; Toshihiro Uwai, Ishiharashi, Japan

[73] Assignee: Chisso Corporation, Osaka, Japan

[21] Appl. No.: 740,999

[22] Filed: Jun. 4, 1985

[30] Foreign Application Priority Data

Jul. 6, 1984 [JP] Japan ................. 59-140322

[51] Int. Cl.$^4$ ................. C08F 4/64
[52] U.S. Cl. .................. 502/105; 502/103; 502/108; 502/113; 502/118; 502/119; 502/121; 502/122; 502/123; 502/124; 502/125; 502/126; 502/127
[58] Field of Search ............... 502/103, 105, 108, 113, 502/118, 119, 121, 122, 123, 124, 125, 126, 127

[56] References Cited

U.S. PATENT DOCUMENTS

| | | | |
|---|---|---|---|
| 3,179,604 | 4/1965 | Ingberman | 502/105 X |
| 3,718,635 | 2/1973 | Tomoshire et al. | 502/105 X |
| 4,192,774 | 3/1980 | Kortbeek et al. | 502/105 |
| 4,304,891 | 12/1981 | Sato et al. | 502/108 X |
| 4,387,198 | 6/1983 | Sato et al. | 502/126 X |

*Primary Examiner*—Patrick P. Garvin
*Attorney, Agent, or Firm*—Fred Philpitt

[57] ABSTRACT

A solid catalyst component for α-olefin polymerization which, when produced, causes any troubles due to its small particle size and when used, yields a spherical polymer of a suitably less particle size and a high bulk density with a slightest quantity of atactic polymer and affording a very good dispersibility of powdery additives therein in spite of its narrow particle size distribution, and a process for producing the same, are provided, which solid catalyst component comprises Ti and Cl as active ingredients, having an average particle diameter of 2 to 10μ, a specific surface area of 100 m$^2$/g or more and a diffraction line corresponding to a distance between lattices of 4.80 to 5.10 Å by way of X-ray diffraction; and which process is characterized in that when TiCl$_4$ is reduced with a reducing agent comprising an organoaluminum compound to produce a solid intermediate, there is employed an agitation intensity defined by definite values of agitation power and baffle ratio.

5 Claims, No Drawings

SOLID CATALYST COMPONENT FOR ALPHA-OLEFIN POLYMERIZATION AND PROCESS FOR PRODUCING SAME

BACKGROUND OF THE INVENTION

1. Field of the Invention

This invention relates to a solid catalyst component for α-olefin polymerization and a process for producing the same. More particularly it relates to the above-mentioned solid catalyst component capable of yielding α-olefin polymer powder having a good dispersibility of powdery additives therein, and a process for producing the same.

2. Description of the Prior Art

α-Olefin polymers have been used for various and wide application uses. Among the polymers, crystalline polypropylene has been broadly used also in the fields of film and sheet due to its superior mechanical properties and optical properties and further advantages of non-toxicity, odorless properties and others. If polypropylene film and sheet (hereinafter referred to as polypropylene film, etc.) have inferior slip properties and blocking resistance, or if they have an insufficient stiffness or transparency, then powdery additives are often added to polypropylene in advance to improve these physical properties. Such addition makes it possible to impart fine projections and depressions on the surface of polypropylene film, etc.

The average particle diameter of such powdery additives is generally 20 microns or smaller and 0.005 micron or larger, and the smaller the particle diameter, often the better the results obtained, for practical use. Whether the dispersibility of such powdery additives in α-olefin polymers (hereinafter abbreviated to polymers) is good or not is ruled by the shape and particle size distribution of the polymer powder.

Namely, the nearer to sphere the shape of the polymer powder and also the narrower the width of the particle size distribution, the inferior the dispersibility. If the dispersion of the powdery additives in a composition consisting of the polymer powder and the powdery additives is inferior such that the dispersion is heterogeneous or agglomeration of the additives is partly observed, then the following problems are raised with the film or sheet obtained by molding the composition: ① disorder of projections and depressions of the film, etc. (non-uniformity); ② inferior appearance and transparency due to uneven dispersion of the additives; ③ occurrence of fish eyes; ④ insufficient stiffness due to no addition effectiveness of the additives; and others.

The above problems may be regarded as technical problems which have occurred accompanying the fact that the shape and particle size distribution of the polymer powder has been, so to speak, improved.

As one of the processes for producing the polymer powder of such shape (note: α-olefin polymerization processes), the present inventors have previously provided processes for producing α-olefin polymer particles having a shape near to sphere, a small average particle diameter and a narrow particle size distribution (Japanese patent application laid-open Nos. Sho 56-119,707/1981 and Sho 56-120,712/1981). The catalysts used in these polymerization processes have a notably improved storage-stability and heat stability, and also a high catalyst activity, and further the resulting polymers have a high bulk density and crystallinity. Still further, since the polymer particles have a spherical shape, there has been an advantage that production and subsequent handling of the polymer are easy.

However, as already described above, the shape of the polymer powder produced using such catalysts has brought about a new problem of inferior dispersibility of the powdery additives as mentioned above.

Namely, according to the above-mentioned inventions of the present inventors, the average particle diameter of the resulting polymer powder is as large as 200 to 500 microns, its shape is spherical and the content of fine particles therein is low; thus there has been a problem in the point of the uniformity of dispersion of the additives in the composition obtained by blending the powdery additives to the above-mentioned polymers.

As one of the processes for improving the dispersibility of the powdery additives in the polymer powder, there is a process of making coexistent with the matrix polymer powder, a considerably large quantity of fine particle polymer. In order to improve the dispersibility, however, it is necessary to make a polymer having a particle diameter of 50 microns or less coexistent in 20% by weight or more. However, as to such a superfine polymer, there is a fear that it may cause handling troubles such that in the polymer production process, it may scatter away during its transportation or its drying step or clog the transportation pipe.

On the other hand, the solid catalyst component per se for producing such a superfine polymer is required to far reduce its particle diameter, but such a solid catalyst component is difficult to produce. Namely, such a solid catalyst component having a superfine particle diameter may be considerably lost at the time of washing and drying in its production process, resulting in reduction of yield or reduction of the capacity of the production apparatus. Further, as to the solid catalyst component having a superfine particle diameter, an abnormal reaction may occur at the time of its use i.e. at the time of α-olefin polymerization such that the proportion of atactic polypropylene formed as a by-product at the time of production of polypropylene may increase notably.

The present inventors have made extensive research in order to find a solid catalyst component for α-olefin polymerization, capable of solving the above various problems, and as a result have found that when $TiCl_4$ is reduced with a reducing agent comprising a specified organoaluminum compound derivative to produce a solid intermediate, if there is employed an agitation intensity for the reaction mixture in the reactor, defined by definite values of agitation power and baffle ratio as defined later, followed by carrying out necessary production process, then a solid catalyst component for α-olefin polymerization, having an average particle diameter of 2 to 10 microns and a spherical shape is obtained, which can solve the above various problems, and have accomplished the present invention.

As is apparent from the foregoing, the object of the present invention (in two aspects) is to provide a solid catalyst component for α-olefin polymerization which, when produced, does not cause the above-mentioned troubles, and when used, yields a polymer having a suitably less particle size and a high bulk density without increasing the quantity of atactic polymer byproduced, which polymer affords a very good dispersibility of powdery additives therein in spite of its narrow particle size distribution and spherical shape; and a process for producing the same. Other objects of the present invention will be apparent from the succeeding description.

SUMMARY OF THE INVENTION

The present invention (in two aspects) has the following main constitutions (1) and (2) and constitutions as embodiments (3) to (5):

(1) a solid catalyst component for α-olefin polymerization, comprising titanium and chlorine as active ingredients, having an average particle diameter of 2 to 10 microns, a specific surface area of 100 m$^2$/g or more, and a diffraction line corresponding to a distance between lattices of 4.80 to 5.10 Å by way of X-ray diffraction;

(2) a process for producing a solid catalyst component for α-olefin polymerization, which process comprises reacting TiCl$_4$ with a reaction product (I) of an organoaluminum compound (A$_1$) with an electron donor (B) under a vigorous agitation defined by a power required for stirring of 0.30 KW/m$^3$ or greater and a baffle ratio of 0.15 or greater to obtain a solid product (II) which is further reacted with an electron donor (B$_2$) and an electron acceptor (E) to obtain a solid catalyst component for α-olefin polymerization having an average particle diameter of 2 to 10 microns and a spherical shape;

(3) a process for producing a solid catalyst component according to the above item (2) wherein said reaction product (I) is obtained by reacting one mol of an organoaluminum compound (A$_1$) with 1 to 4 mols of an electron donor in a solvent at −10° C. to +50° C. for 30 seconds to 5 hours;

(4) a process for producing a solid catalyst component according to the above item (2) wherein said solid product (II) is obtained by reacting TiCl$_4$ with said reaction product (I) in a ratio of the number of Al atoms in said reaction product (I) to the number of Ti atoms in TiCl$_4$, of 0.05 to 1.0, at 0° to 200° C. for 5 minutes to 8 hours; and (5) a process for producing a solid catalyst component according to the above item (2) wherein 100 g of said solid product (II) is reacted with 50 to 200 g of an electron donor (B$_2$) and 20 to 500 g of an electron acceptor (E) in the presence of 100 to 1,000 ml of a solvent, at 50° to 100° C. and for 5 minutes to 5 hours.

DETAILED DESCRIPTION OF THE PREFERRED EMBODIMENTS

The constitution and effectiveness of the present invention will be described below in more detail.

In the present invention, TiCl$_4$ is first reduced with a reaction product (I) described below to prepare a solid product (II). The reaction product (I) is obtained by reacting an organoaluminum compound (A$_1$) with an electron donor (B$_1$) (the details and concrete examples of (A$_1$) and (B$_1$) will be described later) under the following conditions:

As to the reaction conditions, the above two are reacted in a solvent (D) at −10° to +50° C. for 30 seconds to 5 hours, and the proportion of their quantities is preferred to be 1 to 4 mols of an electron donor and 0.5 to 2 l of a solvent based on one mol of an organoaluminum compound. The reaction of the thus obtained reaction product (I) with TiCl$_4$ is carried out at 0° to 200° C., preferably 10° to 90° C. for 5 minutes to 8 hours with vigorous agitation. The proportion of the reaction product (I) to TiCl$_4$ is given in terms of a ratio (Al/Ti) of the number of Al atoms in the former to the number of Ti atoms in the latter of 0.05 to 1.0, preferably 0.06 to 0.2. Further, both the reaction raw materials are mechanically vigorously agitated in the reactor and the power required therefor is 0.30 KW/m$^3$ or more and the baffle ratio is 0.15 or more. In addition, the power is expressed by a power consumed per unit volume of the reaction mixture, and the baffle ratio is defined in terms of $(B/D)^{1.2} \times nB$ wherein B represents the width (m) of baffle plates, D, the diameter of the reactor and nB, the number of baffle plates.

If the power is less than 0.30 KW/m$^3$ or the baffle ratio is less than 0.15, it is impossible to ultimately obtain a solid catalyst component having a particle diameter and a shape as mentioned later. Further, the upper limits of the values of the power and baffle ratio have no particular limitation, but even if these values are notably increased, this is not accompanied with any particular improvement in effectiveness and hence uneconomical.

The reaction of TiCl$_4$ with the reaction product (I) carried out as above yields a solid product (II). After completion of the reaction, filtering off or decantation is carried out at a temperature of 50° C. or higher to separate a liquid portion, followed by repeating washing with a solvent at 30° C. or higher. The resulting solid product (II) is reacted with an electron donor (B$_2$) and an electron acceptor (E). In this reaction, use of a solvent such as aliphatic hydrocarbons affords preferable results. The proportions of the reaction raw materials are preferably 50 to 200 g of (B$_2$), 20 to 500 g of (E) and 100 to 1,000 ml of a solvent each based on 100 g of the solid product (II), and the reaction temperature and time are 50° to 100° C. and 5 minutes to 5 hours, respectively.

After completion of the reaction, filtering off or decantation is carried out to remove a liquid portion and washing with a solvent is repeated to obtain a solid catalyst component of the present invention, which is then dried and taken out in the form of solids or subjected to the subsequent use in a suspended state in the solvent as it is.

The thus obtained solid catalyst component of the present invention is a titanium trichloride composition containing titanium and chlorine as active ingredients and consisting of spherical fine particles having an average particle diameter of 2 to 10 microns, a narrow particle size distribution, a diffraction line corresponding to a distance between lattices of 4.80 to 5.10 Å by way of X-ray diffraction and a specific surface area of 100 m$^2$/g or more.

The catalyst for α-olefin polymerization relative to the present invention comprises the above solid catalyst component and an organoaluminum compound as indispensable constituents. Its concrete examples are the following ①~④:

① a catalyst obtained by combining the solid catalyst component with an organoaluminum compound (A$_2$), followed by reacting an α-olefin (F$_1$) with the combination to effect preactivation; ② a catalyst obtained by combining the solid catalyst component, an organoaluminum compound (A$_2$) and an electron donor (B$_3$), followed by reacting an α-olefin (F$_1$) with the combination to effect preactivation; ③ a preactivated catalyst obtained by adding an electron donor (B$_4$) after the above procedure ① or ②; and ④ a preactivated catalyst obtained by adding a reaction product (G) of an electron donor (B$_4$) with an organoaluminum compound (A$_3$) after the above procedure ① or ②.

The proportions of materials used in the above preactivation are 0.1 to 10 g of an organoaluminum compound (A$_2$), 0 to 5 l of a solvent, 0.001 to 1.0 g of an electron donor (B$_3$), 0.05 to 3,000 g of an α-olefin (F$_1$) and 0.01 to 5.0 g of an electron donor (B$_4$) and 0.02 to 15 g of a reaction product (G), each based on 1 g of the solid catalyst component. As to the preparation conditions of the reaction product (G), 0.01 to 5.0 g of an electron donor (B$_4$) is reacted with 0.01 to 10 g of an organoaluminum compound (A$_3$) in 10 to 10,000 g of a solvent, at 0° to 100° C. for one minute to 20 hours.

The reaction of an α-olefin (F$_1$) with the combination of the solid catalyst component with an organoaluminum compound may be carried out also in an aliphatic hydrocarbon solvent, or the o-olefin may be also reacted with the combination in gas phase. α-Olefin (F$_1$) is reacted at 0° to 100° C., preferably 10° to 80° C. for one minute to 20 hours. Examples of α-olefin (F$_1$) used for the preactivation are ethylene, propylene, butene-1, hexene-1, heptene-1, 4-methyl-pentene-1, 2-methyl-pentene-1 and 3-methyl-butene-1. Further, styrene may also be used in place of the α-olefin (F$_1$). These α-olefins or styrene may be used alone or in admixture of two kinds or more, and may be the same as or different from α-olefin as the object of polymerization as described later. The catalyst relative to the present invention after completion of the preactivation may be freed from portions of coexistent solvent and organoaluminum compound and unreacted α-olefin by way of filtering off or distilling off under reduced pressure to obtain dried powder which may be then used for α-olefin polymerization, or alternatively may be diluted with a solvent without carrying out the above filtering off or the like, and used.

The thus obtained catalyst for α-olefin polymerization relative to the present invention may be used for polymerization accompanied with no change in phase during the polymerization such as slurry polymerization, bulk polymerization or gas phase polymerization of α-olefins and also for polymerization accompanied with change in phase midway during the polymerization such as bulk polymerization followed by gas phase polymerization or slurry polymerization followed by gas phase polymerization.

Examples of α-olefins to which the catalyst for α-olefin polymerization relative to the present invention is applied are linear chain monoolefins such as ethylene, propylene, butene-1, hexene-1, octene-1, etc. and branched chain monoolefins such as 4-methyl-pentene-1, 2-methylpentene-1, 3-methyl-butene-1, etc. The catalyst may be also used for styrene polymerization. The above monomers may be used not only for homopolymerization but for copolymerization such as binary copolymerization of e.g. ethylene and propylene, ethylene and butene-1, propylene and butene-1, etc. and further ternary copolymerization of e.g. ethylene, propylene and butene-1.

The copolymerization conditions are the same as those in the case where other catalysts for α-olefin polymerization are used. The thus obtained α-olefin polymer is characterized in that the percentage of atactic polymer byproduced is low and its bulk density is high and further in particular, when it is blended with powdery additives, the dispersibility of the additives therein is good.

In addition, the powdery additives as the object of such improvement in the dispersibility refer to those having an average particle diameter of 20 to 0.005 micron and a melting point of 250° C. or higher, and concrete examples thereof are silicon dioxide, talc, kaolin, sericite, etc. which are known as antiblocking agent for poly-α-olefin film or sheet, hydrotalcite, etc. as neutralizing agent and aluminum p-t-butylbenzoate as neucleus-creating agent.

The organoaluminum compounds used in the present invention are expressed by the general formula AlR$_n$R'$_{n'}$X$_{3-(n+n')}$ wherein R and R' each represent a hydrocarbon group such as alkyl group, aryl group, alkaryl group, cycloalkyl group, etc. or alkoxy group; X represents a halogen such as fluorine, chlorine, bromine or iodine; and n and n' each represent an optional number of $0 < n+n' \leq 3$, and concrete examples are trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc., dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide, etc.; alkylaluminum hydrides such as diethylaluminum hydride, dibutylaluminum hydride; and alkylaluminum sesqui or dihalides such as methylaluminum sesquichloride, ethylaluminum sesquichloride, ethylaluminum dichloride, i-butylaluminum dichloride, etc. Besides, alkoxyalkylaluminums such as monoethoxydiethylaluminum, diethoxymonoethylaluminum, etc. may be also used. These organoaluminum compounds may be also used in admixture of two kinds or more. The organoaluminum compound (A$_1$) to be combined with the reaction product (I), the organoaluminum compound (A$_2$) to be combined with the solid catalyst component and the organoaluminum compound (A$_3$) to be combined with the electron donor (B$_4$) may be the same or different.

The electron donors (B$_1$), (B$_2$), (B$_3$) and (B$_4$) used in the present invention refer to organic compounds or inorganic compounds containing at least one atom of oxygen, nitrogen, sulfur and phosphorus, such as ethers, alcohols, esters, aldehydes, fatty acids, ketones, nitriles, amines, amides, ureas, thioureas, isocyanates, azo compounds, phosphines, phosphites, phosphinites, carbonyl sulfide, hydrogen sulfide, thioethers, thioalcohols, etc. Concrete examples are ethers such as diethyl ether, di-n-propyl ether, diisopropyl ether, methyl n-butyl ether, methyl tert-butyl ether, ethyl n-propyl ether, di-n-butyl ether, di-n-pentyl ether, di-2-methylbutyl ether, di-3-methylbutyl ether, methyl n-amyl ether, methyl isoamyl ether, ethyl n-amyl ether, ethyl neopentyl ether, di-n-hexyl ether, di-i-hexyl ether, ethyl n-hexyl ether, ethyl α-methylhexyl ether, di-n-octyl ether, di-i-octyl ether, di-n-dodecyl ether, diphenyl ether, ethylene glycol dimethyl ether, di-ethylene glycol dimethyl ether, triethylene glycol dimethyl ether, tetraethylene glycol dimethyl ether, tetrahydrofuran, and the like; alcohols such as methanol, ethanol, propanol, butanol, n-amyl alcohol, iso-amyl alcohol, 2-methyl butanol, hexanol, octanol, etc.; phenoles such as phenol, cresol, xylenol, ethylphenol, naphthol and the like; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate and the like; aldehydes such as acetaldehyde, benzaldehyde and the like; fatty acids such as formic acid, acetic acid, propionic acid, butyric acid, oxalic acid, succinic acid, acrylic acid, maleic acid and the like; aromatic acids such as benzoic acid and the like; ketones such as methyl ethyl ketone, methyl isobutyl ketone, benzophenone and the like; nitriles such as acetonitrile, butyronitrile, etc.; amines such as methylamine, diethylamine, tributylamine, triethanolamine, β(N,N-dimethylamino)ethanol, pyridine, quinoline, α-picoline, 2,4,6-trimethyl-pyridine, N,N,N',N'-tetramethylhexathylene diamine, aniline, dimethylaniline and the like; amides such as formamide, hexamethylphosphoric acid triamide, N,N,N',N',N"-pentamethyl-N'-β-dimethylaminomethylphosphoric acid triamide, octamethylpyrophosphoroamide and the like; ureas such as N,N,N',N'-tetramethylurea and the like; isocyanates such as phenylisocyanate, toluylisocyanate and the like; azocompounds such as azobenzene, azotoluene, and the like; phosphines such as ethylphosphine, triethylphosphine, tri-n-butylphosphine, tri-n-octylphosphine, triphenylphosphine, triphenylphosphine oxide and the like; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite and the like; thioethers such as diethyl thioether, diphenyl thioether, methyl phenyl thioether, ethylene sulfide, propylene sulfide and the like; and thioalcohols such as ethylthioalcohol, n-propylthioalcohol, thiophenol and the like. These electron donors may be used in admixture.

The electron donor ($B_1$) for obtaining the reaction product (I), the donor ($B_2$) to be reacted with the solid product (II), the donor ($B_3$) to be used for the preactivation and the donor ($B_4$) for obtaining the reaction product (G) may be the same or different, respectively.

The electron acceptor (E) employed in the present invention is represented by halides of elements of Groups III to VI of the Periodic Table. Concrete examples are anhydrous aluminum chloride, $SiCl_4$, $SnCl_2$, $SnCl_4$, $TiCl_4$, $ZrCl_4$, $PCl_3$, $PCl_5$, $VCl_4$, $SbCl_5$, etc. These may be used in admixture. $TiCl_4$ is most preferable.

As for the solvent, the following may be used:

As aliphatic hydrocarbons, n-pentane, n-hexane, n-heptane, n-octane, i-octane, etc. are exemplified. Further, in place of or together with aliphatic hydrocarbons, halogenated hydrocarbons may also be used such as carbon tetrachloride, chloroform, dichloroethane, trichloroethylene, tetrachloroethylene, etc. As aromatic compounds, aromatic hydrocarbons such as benzene, toluene, xylene, naphthalene and their derivatives such as alkyl substitutes e.g. mesitylene, durene, ethylbenzene, isopropylbenzene, 2-ethylnaphthalene, 1-phenylnaphthalene, halogenated compounds e.g. monochlorobenzene, chlorotoluene, chlorostyrene, chloroethylbenzene, dichlorobenzene, bromobenzene, etc. are exemplified.

A first effectiveness of the present invention is that it has become possible to produce α-olefin polymer particles having a spherical shape and a narrow particle size distribution and capable of well dispersing therein added powdery additives in the form of fine particles of 20 to 0.005 micron, in stabilized manner and without raising any handling problems such as scattering away of superfine particles. Thus, even in the case of spherical particles having a narrow particle size distribution, it has become possible to obtain a good dispersion of powdery additives to a similar or larger extent as compared with that in the case of α-olefin polymers produced by the use of so far employed catalysts of $TiCl_3$ (AA) type or its modified type accompanied with milling, and thereby obtain a product exhibiting an improved blocking resistance and a superior stiffness and transparency when used for film, sheet, etc.

A second effectiveness of the present invention is that it has become possible to produce a spherical solid catalyst component having an average particle diameter of 2 to 10 microns without any reduction in yield.

A third effectiveness of the present invention is that it has become possible to provide a catalyst having retained the same effectiveness as in the prior invention of the present inventors, that is, the solid catalyst component constituting the catalyst has so high a storage stability that even when the solids are allowed to stand at a high temperature of about 30° C. over about 4 months, there occurs no notable reduction in polymerization activity and hence storage under cooling at about 0° C. is unnecessary; even in the case of catalysts for α-olefin polymerization, having combined the solid catalyst component with an organoaluminum compound, etc., even when they are allowed to stand at 30° C. or higher, there occurs neither notable reduction in polymerization activity nor shape deterioration of polymer particles; and even when polymerization is carried out at a relatively high temperature of 70° C. or higher, it is possible to inhibit swelling of polymer particles with solvents and increase of by-products such as atactic polypropylene.

The present invention will be described below by way of Examples.

EXAMPLE 1

(1) Production of solid catalyst component

Four baffle plates having a lateral width of 15 mm and a length of 130 mm (baffle ratio: 0.20) and an agitating element were fixed to a 5 l capacity reactor having an inner diameter of 180 mm, a height of 222 mm and a semi-elliptic bottom surface. A solution of diethylaluminum monochloride (DEAC) (0.83 mol) dissolved in n-hexane (1.17 l) was mixed with diisoamyl ether (1.99 mol) over 5 minutes, followed by reacting these at 35° C. for one hour to obtain a reaction liquid (I) (molar ratio of diisoamyl ether/DEAC, 2.40). The reactor was purged with nitrogen gas and $TiCl_4$ (7.47 mol) was placed therein and heated to 38° C., followed by dropwise adding the above reaction liquid (I) with stirring at 450 rpm (number of revolutions per minute) at 38° C. over one hour. After dropwise addition of the total quantity of the reaction liquid (I), the power ($KW/m^3$) required for the stirring was measured to give a value of 0.75. The mixture was kept at 38° C. for one hour with this vigorous stirring, followed by raising the temperature up to 78° C., reacting it further for one hour, thereafter effecting deposition at the same temperature, removing the supernatant, twice repeating a procedure of adding n-hexane (3 l) and removing the supernatant by decantation, suspending the resulting solid product (II) (284 g) in n-hexane (300 ml), adding $TiCl_4$ (493 g) and diisoamyl ether (274 g), reacting the mixture at 65° C. for one hour, thereafter removing the supernatant at 35° C., 5 times repeating a procedure of washing with n- hexane (3 l) and drying under reduced pressure to obtain a solid catalyst component (301 g).

(2) Measurement of solid catalyst component (2 - 1) Measurement of average particle diameter and particle size distribution:

The particle size distribution of the resulting solid catalyst component was measured by means of Micron Photosizer (manufactured by Seishin Kigyo Co.) to give an average particle diameter of 5.5 microns. And 98% by weight of the particles had particle diameters in the range of 3 to 8 microns; thus the particle size distribution was narrow.

(2 - 2) Measurement of specific surface area

The specific surface area was measured according to BET method using Accusorb 2100 type (manufactured by Micromeritics Co.) to give 138 m$^2$/g.

(2 - 3) X-ray diffraction

The catalyst component was subjected to X-ray diffraction at 40 KV and 20 mA, using a goniometer (manufactured by Rigaku Denki Co., Ltd.) according to powder method (Cu K line ($\lambda$=1.54 Å), filter (Ni)), whereby a diffraction line corresponding to a distance between lattices of 4.85 Å was observed.

(3) Preparation of catalyst for α-olefin polymerization

Into a 1 l capacity stainless reactor equipped with slanted blades and purged with nitrogen gas were added n-hexane (500 ml), diethylaluminum monochloride (6.6 g), diethylene glycol dimethyl ether (0.0022 g) and the above solid catalyst component (average particle size: 5.5 microns) (3.0 g), followed by feeding propylene (18.0 g) at 20° C. over 6 hours to effect reaction. After completion of the feed, reaction was further carried out for 3 hours with stirring, followed by purging unreacted propylene to obtain a preactivated catalyst. The quantity of propylene reacted per g of the solid catalyst component was 5.4 g.

REFERENCE EXAMPLE 1

In a 50 l capacity stainless reactor equipped with slanted blades and purged with nitrogen gas were placed n-hexane (23 l) and the above preactivated catalyst slurry (69 ml) (the contents of the above solid catalyst component and the preactivated catalyst being 0.41 g and 3.56 g, respectively), followed by closing the reactor, introducing hydrogen (7 l), thereafter polymerizing propylene at 75° C. and 10 Kg/cm$^2$G for 5 hours, and thereafter drying to obtain polypropylene (4.8 Kg). This polypropylene had an average particle size of 192 microns, and 89.9% by weight thereof had particle sizes in the range of 150 to 250 microns.

This polypropylene (4.0 Kg) was blended with silicon dioxide having an average particle diameter of 3.5 microns (16 g) (Syloid 244, a tradename of product made by Fuji Davison Co.), silicon dioxide having an average particle diameter of 0.05 micron (4 g) (Aerosil 200, a tradename of product made by Japan Aerosil Co.), calcium stearate (4.0 g) and 2,6-di-t-butyl-p-cresol (1.0 g), by means of a 20 l capacity Henschel mixer (trade name) for 3 minites, followed by granulating the blend by means of a granulator of 40 mm in diameter and then making a polypropylene film of 30 microns thick. According to observation of this film with naked eyes, the dispersion of silicon dioxide powder was good; the blocking resistance was also good; and the transparency was also good, the haze (haze (%) of film according to ASTM-D-1003) being 1.9%.

EXAMPLE 2

Example 1 was repeated except that 8 baffle plates having a lateral width of 13 mm and a length of 100 mm and a power required for stirring of 0.87 KW/m$^3$ were employed, to obtain a solid catalyst component having an average particle diameter of 4.2 microns. This solid catalyst component had a specific surface area of 145 m$^2$/g, and according to its X-ray diffraction, a diffraction line corresponding to a distance between lattices of 4.95 Å was observed.

This solid catalyst component (2.0 g) was suspended in n-hexane (1,000 ml), followed by adding diethylaluminum monochloride (13.0 g) and reacting propylene (4.2 g) at 30° C. for 2 hours and thereafter adding methyl p-toluylate (0.3 g) to obtain a preactivated catalyst.

Using this preactivated catalyst slurry (250 ml) (the contents of the solid catalyst component and the preactivated catalyst being 0.5 g and 4.88 g, respectively), polypropylene was produced in the same manner as in Reference example 1. The dispersibility of silicon dioxide powder in the polypropylene was observed. As a result, dispersion unevenness of silicon dioxide was not observed; the blocking resistance was also good; and the haze was 1.8%.

EXAMPLE 3

Example 1 was repeated except that 4 baffle plates having a lateral width of 13 mm and a length of 120 mm (baffle ratio: 0.17) and a power required for stirring of 0.55 KW/m$^3$ were employed; and diisoamyl ether (1.7 mol) for preparing the reaction product (I) (molar ratio of diisoamyl ether/DEAC: 2.05) and TiCl$_4$ (6.2 mols) were used and reaction of TiCl$_4$ with the reaction product (I) was carried out at 14° C. for 2 hours, to obtain a solid catalyst component (284 g) having a spherical shape of an average particle diameter of 7.0 microns, a narrow particle size distribution and an X-ray diffraction line corresponding to a distance between lattices of 4.87 Å.

To this solid catalyst component (5.0 g) were added diethylaluminum monochloride (7.0 g), tetraethylene glycol dimethyl ether (0.06 g) and n-heptane (152 g), and propylene (150 g) was reacted at 38° C. over 8 hours, followed by adding ethyl p-anisate (0.2 g) to obtain a preactivated catalyst.

Reference example 1 was then repeated except that using the slurry containing the preactivated catalyst (9.86 g) (the content of the solid catalyst component: 0.30 g), propylene was polymerized at 68° C. and 8 Kg/cm$^2$G for 4 hours, to obtain polypropylene (2.4 Kg), with which were then blended silicon dioxide powder (Syloid 404, a tradename of product manufactured by Fuji Davidson Co.) having an average particle diameter of 10 microns (9.6 g), calcium stearate (2.4 g) and 2,6-di-t-butyl-p-cresol (1.2 g) by means of a Henschel mixer (trade name) to make a film. The dispersibility of the silicon dioxide powder was good; the blocking resistance was also good; and the haze was 2.0%.

EXAMPLE 4

Example 1 was repeated except that using triethylaluminum (0.55 mol), n-butyl ether (1.5 mol) and n-heptane (0.6 l), reaction was carried out at 45° C. for 4 hours to obtain a reaction product (I) (molar ratio of n-butyl ether/triethylaluminum: 2.8), which was then reacted with TiCl$_4$ (6.6 mols) at 44° C. for 0.5 hour with a power required for stirring of 0.95 KW/m$^3$, followed by keeping the reaction mixture at the same temperature for 2 hours, thereafter raising the temperature up to 68° C., further reacting it for 2 hours to obtain a solid product (II) (292 g), to which was then added n-butyl ether (193 g) and TiCl$_4$ (344 g), followed by reacting the mixture at 75° C. for 2 hours, to obtain a spherical solid catalyst component having an average particle diameter of 8.0 microns (299 g).

To this solid catalyst component (1 g) were added di-n-propylaluminum monochloride (0.57 g) and n-pentane (67 ml), followed by reacting propylene (4.0 g) at 18° C. for one hour in the mixture and then adding diethylaluminum monochloride (1.5 g) and diethylene glycol dimethyl ether (0.01 g) to obtain a preactivated catalyst.

Reference example 1 was repeated except that propylene was polymerized at 70° C. for 3 hours, using the above preactivated catalyst (3.54 g) containing the solid catalyst component (0.5 g), to obtain polypropylene, followed by repeating Reference example 1 except that aluminum p-t-butylbenzoate (average particle diameter: 2.5 microns) (16 g) was added in place of silicon dioxide to observe the dispersibility of the additive. A good dispersibility was exhibited.

COMPARATIVE EXAMPLE 1

Example 1 was repeated except that the reaction of the reaction product (I) with TiCl$_4$ was carried out with a power required for stirring of 0.25 KW/m$^3$, to obtain a solid catalyst component having an average particle diameter of 18 microns. Using this solid catalyst component, a preactivated catalyst was obtained in the same manner as in Example 1, followed by obtaining polypropylene in the same manner as in Reference example 1, to observe the dispersibility of silicon dioxide powder. As a result, its dispersion unevenness was notable, and although its blocking resistance was good, its haze was far inferior (3.8%).

COMPARATIVE EXAMPLE 2

Example 3 was repeated except that the reaction of the reaction product (I) with TiCl$_4$ was carried out with a power required for stirring of 0.28 KW/m$^3$ to obtain a solid catalyst component having an average particle diameter of 13 microns, followed by preparing a preactivated catalyst in the same manner as in Example 1 and then producing polypropylene and observing the dispersibility of silicon dioxide powder in the film of the polypropylene in the same manner as in Reference example 1. Its dispersion unevenness was notable and its haze was also inferior (3.2%).

TABLE 1

| Number | Solid catalyst component | | | | | | | | Results of polypropylene production | | |
|---|---|---|---|---|---|---|---|---|---|---|---|
| | Average particle diameter (micron) | Specific surface area (m$^2$/g) | X-ray diffraction (Å) | | | | | | Average particle diameter (micron) | Isotactic index | Bulk density |
| Example 1 | 5.5 | 138 | 4.85 m broad | 2.71 s | 2.15 w | 1.77 m | 1.70 w | 1.48 ww | 192 | 99.8 | 0.48 |
| Example 2 | 4.2 | 145 | 4.95 s | 2.71 s | 2.14 w | 2.00 m | 1.78 m | 1.49 w | 165 | 99.0 | 0.46 |
| Example 3 | 7.0 | 125 | 4.87 s | 2.71 s | 2.16 w | 1.77 m | 1.72 m | 1.48 w | 198 | 99.2 | 0.49 |
| Example 4 | 8.0 | 118 | 4.98 s | 2.71 s | 2.15 w | 1.77 m | 1.71 m | 1.49 w | 199 | 99.5 | 0.49 |
| Comparative ex. 1 | 18.0 | 132 | 4.85 s | 2.71 s | 2.15 w | 1.77 m | 1.70 w | 1.49 ww | 370 | 99.5 | 0.51 |
| Comparative ex. 2 | 13.0 | 129 | 4.86 s | 2.71 s | 2.15 w | 1.77 m | 1.70 w | 1.48 ww | 292 | 99.4 | 0.51 |

What we claim is:

1. A solid catalyst component for α-olefin polymerization, comprising a TiCl$_3$ composition having an average particle diameter of 2 to 10 microns, a specific surface area of 100 m$^2$/g or more, and a diffraction line corresponding to a distance between lattices of 4.80 to 5.10 Å by way of X-ray diffraction.

2. A process for producing a solid catalyst component for α-olefin polymerization, which process comprises reacting TiCl$_4$ with a reaction product (I) of an organoaluminum compound (A$_1$) with an electron donor (B) under a vigorous agitation defined by an agitation power required of 0.30 KW/m$^3$ or greater and a baffle ratio of 0.15 or greater to obtain a solid product (II) which is further reacted with an electron donor (B$_2$) and an electron acceptor (E) to obtain a solid catalyst component for α-olefin polymerization having an average particle diameter of 2 to 10 microns and a spherical shape.

3. A process for producing a solid catalyst component according to claim 2 wherein said reaction product (I) is obtained by reacting one mol of an organoaluminum compound (A$_1$) with 1 to 4 mols of an electron donor in a solvent at −10° C. to +50° C. for 30 seconds to 5 hours.

4. A process for producing a solid catalyst component according to claim 2 wherein said solid product (II) is obtained by reacting TiCl$_4$ with said reaction product (I) in ratio of the number of Al atoms in said reaction product (I) to the number of Ti atoms in TiCl$_4$, of 0.05 to 1.0, at 0° to 200° C. for 5 minutes to 8 hours.

5. A process for producing a solid catalyst component according to claim 2 wherein 100 g of said solid product (II) is reacted with 50 to 200 g of an electron donor (B$_2$) and 20 to 500 g of an electron acceptor (E) in the presence of 100 to 1,000 ml of a solvent, at 50° to 100° C. and for 5 minutes to 5 hours.

* * * * *